July 9, 1946.   H. L. BURNAT   2,403,478
DAMPING FLYWHEELS
Filed Feb. 1, 1943   2 Sheets-Sheet 1
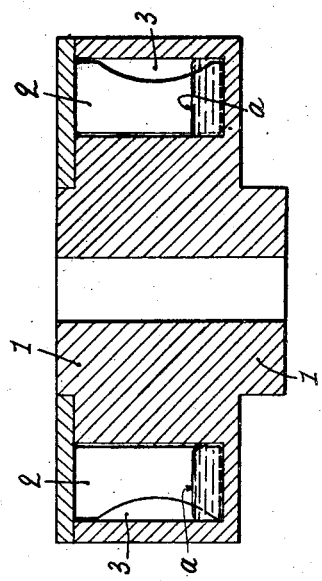
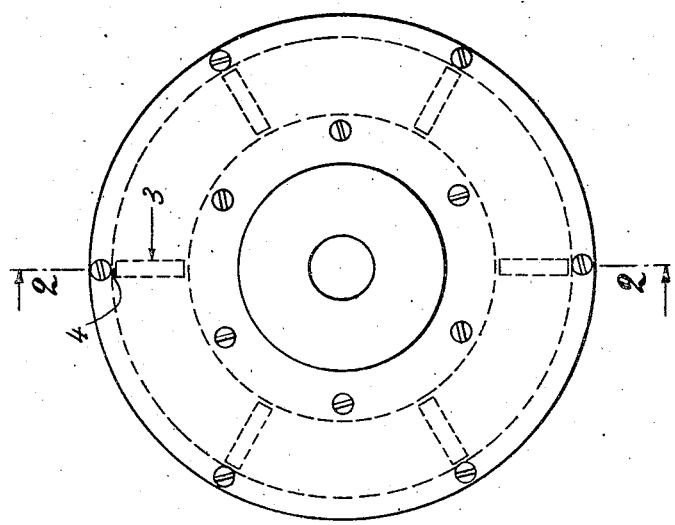
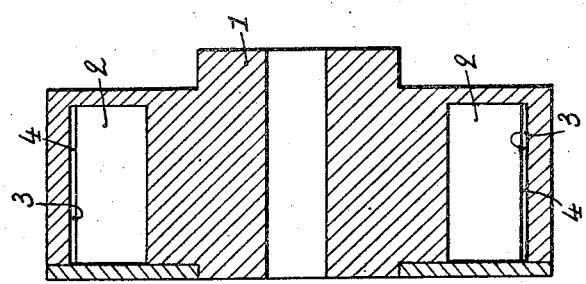
INVENTOR
Henri Louis Burnat
By
his Atty.

Patented July 9, 1946

UNITED STATES PATENT OFFICE 2,403,478

DAMPING FLYWHEEL

Henri Louis Burnat, Paris, France; vested in the Alien Property Custodian

Application February 1, 1943, Serial No. 474,319
In France June 25, 1941

6 Claims. (Cl. 74—572)

The present invention relates to a fly-wheel of variable inertia, intended to damp the tangential vibrations transmitted by a rotary shaft, and of the type comprising a cavity containing a liquid. The mobility of the liquid relative to the solid part of the fly-wheel creates by friction, an absorption of energy which produces the damping of the tangential vibrations.

Preferably, the liquid must have a specific weight as great as possible, which practically leads to the use of mercury.

The mobility of the liquid mass relative to the solid part of the fly-wheel can be varied, according to this invention, on account of the passage for the liquid in said cavity being variable as to shape and/or cross section, either in the circumferential direction, or in the axial direction, or in both said directions. It is, for instance, possible to cause the liquid to flow circularly through calibrated orifices formed in partitions symmetrically arranged in a cavity having the shape of a body of revolution. Certain important effects might be obtained by using viscous liquids, in order to increase the friction effect of the liquid on the walls of the cavity, or through the calibrated orifices in the partitions of said cavity.

When the fly-wheel is mounted on a shaft which rotates at a single definite working speed, the cavity in the shape of a body of revolution is preferably completely filled with the heavy liquid, so as to have the maximum inertia, and therefore the maximum efficiency.

When the fly-wheel is mounted on a shaft having a plurality of working speeds, the cavity in the shape of a body of revolution can be only partly filled, so that the inertia of the structure can vary according to the speed used, by the displacement of the centre of inertia of the liquid.

In the case of a fly-wheel intended to operate at several different working-speeds, use can be made of a fly-wheel having a vertical axis, the cavity of which in the shape of a body of revolution is only partly filled with the liquid, so that the inertia of the whole varies according to the speed. The cavity in the shape of a body of revolution can even be given a suitable profile for increasing this effect, or its generatrix can be given a certain inclination relative to the axis of the fly-wheel, so that the liquid mass, under the action of centrifugal force, moves vertically and that the radius of rotation of its centre of inertia varies in function of the instantaneous speed, thereby causing the total inertia of the fly-wheel to vary.

In fly-wheels constructed according to the principles above set forth, the liquid, upon starting, facilitates the latter, by only gradually acquiring the working speed of the fly-wheel; likewise, upon stopping, the latter is facilitated by the fact that the speed of the liquid is always greater than that of the fly-wheel. Upon starting, there is absorption of energy, and the latter is restituted upon stopping.

Likewise, during operation, when the working speed has been attained for some time, the two solid and liquid masses of the fly-wheel rotate at the same speed; if, at this instant, a disturbance takes place in the speed, the liquid mass immediately moves to act in antagonism to said disturbance; the disturbing energy is braked by the absorption of energy produced by the friction effects of the liquid on the walls or in the calibrated orifices.

The invention will be more clearly understood by referring to the accompanying drawings, which show, by way of example, various embodiments for carrying the invention into practice based on these main principles, and in which:

Fig. 1 is an elevation of a fly-wheel having a horizontal axis, according to the invention;

Fig. 2 is a section according to line 2—2 of Fig. 1;

Fig. 3 is a section similar to Fig. 2 showing a fly-wheel having a vertical axis;

Figure 4:
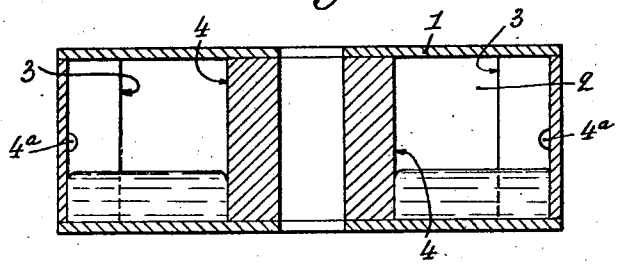
Figure 5:
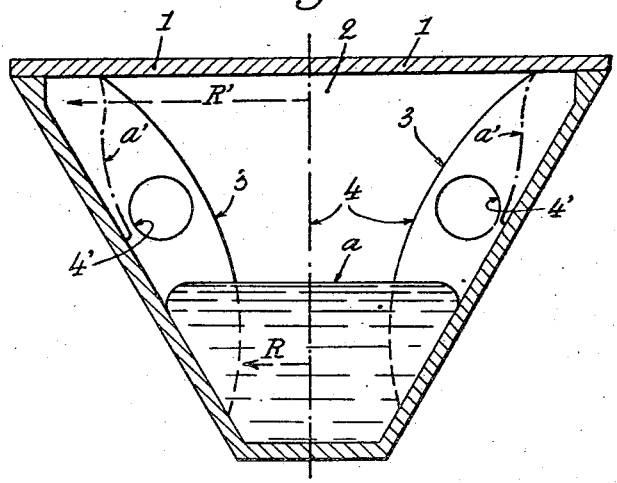
Figure 6:
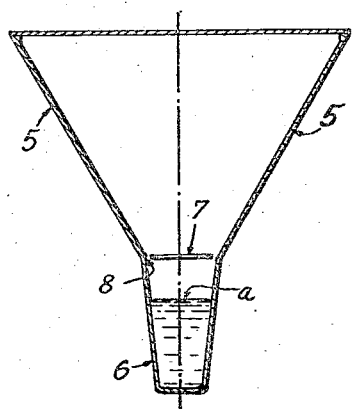

Fig. 4 diagrammatically shows a modification of Fig. 3;

Fig. 5 is a section similar to Fig. 3, showing a fly-wheel having a vertical axis and a conical wall;

Fig. 6 diagrammatically shows a modification of Fig. 5.

Referring to Figs. 1 and 2, the numeral 1 designates the solid hub portion of a fly-wheel, which fly-wheel has an annular cavity 2 near the periphery thereof, the cross-sectional shape of said cavity being rectangular. A liquid, such as mercury, completely fills the cavity 2.

The cavity 2 is obstructed at intervals by blades or solid portions 3, leaving between them and the walls of the cavity calibrated orifices 4. These blades are uniformly spaced apart along the circumference so as to obtain a static and dynamic equilibrium.

The fly-wheel can be directly mounted on the shaft of which the vibrations are to be damped, when the speed of said shaft is sufficient, or if the speed of said shaft is insufficient, the fly-wheel can be mounted on an intermediate shaft mechanically connected to the main shaft to which is imparted a sufficient speed of rotation by suitable transmission members. In this manner, it is possible to proportion the efficiency of the fly-wheel by its own mass, by that of the mercury, and by its speed of rotation.

In the example of Fig. 3, the fly-wheel rotates about a vertical axis and the internal cavity is partially filled with the mercury, the reference character $a$ designating the free surface of the mercury. Moreover, the shape of the openings 3 is such that the circumferential flow of the mercury is greater when the mercury is projected by centrifugal force against the cylindrical wall than at slow speeds, for which the mercury occupies the bottom of the cavity 2.

The arrangement of the fly-wheel elements such as, the cross section of the blades, and the various openings formed therein, can be such that the mercury in position of rest is in either contacting or non-contacting position with said elements. Furthermore, the arrangement may be such that the openings in the blades intervene in totality or in part only for certain speeds, determining the distance separating the mass of mercury from the axis of rotation.

The efficiency of the fly-wheel is thus made a function of the speed of rotation of the shaft.

The vibrations of the rotating spindle or shaft are damped by corresponding displacements of the mercury, and these displacements are, in turn, braked by the openings formed in the obturating blades. Therefore, the shape and cross section of said openings will be adjusted in function of the frequency and of the amplitude of the vibrations to be damped.

In the example of Fig. 4, the openings 4 are located towards the centre, so that the section of passageway is maximum at slow speeds, and becomes reduced to that of the openings 4ª at high speeds, when the mercury is projected by centrifugal force against the cylindrical walls.

The openings 4ª might even be eliminated, in which case the mass of mercury will form a block with that of the solid portions of the fly-wheel for a sufficiently high uniform speed of rotation. In this latter arrangement of the fly-wheel of variable inertia, the damping effect on the vibrations results from the mobility of the mercury in the space comprised between two consecutive blades 3, the instantaneous accelerations or decelerations resulting in a rush of the mercury against the down-side or up-side blade, respectively, with correlative modification of the radius of rotation of the mass of mercury.

In the example of Fig. 5, the variation of the radius of rotation of the mercury in function of the speed is amplified by giving a conical shape to the outer wall of the cavity 2.

Upon starting, the radius of rotation of the mass of mercury is R. When the speed of rotation of the fly-wheel is sufficient, the entire mass of mercury is projected by centrifugal force towards the large base of the cone and the free surface of the mercury is at $a'$, the radius of rotation becoming R'.

Each particle of mercury is subjected to a variable force representing the resultant of its weight and of centrifugal force. To each speed of rotation corresponds a different free surface $a'$ and a radius of rotation R', so that the variation of inertia of the fly-wheel is progressive. The openings 4' are arranged in such a manner that they enter in action for the normal working speed of rotation of the fly-wheel.

In the example of Fig. 6, the fly-wheel comprises a conical part 5 and a cylindrical appendix 6 or of less conicity, so as to modify the law of progressivity of the variation of inertia in function of the speed. A screen 7, providing calibrated openings 8, can also be arranged to brake the flow of the liquid from part 6 into part 5 under the action of centrifugal force.

In this example, the mercury is drawn along by friction against the walls of the cavity. The surface condition of said walls determines the importance of the friction of the mercury.

It is to be understood that the invention is not limited to the few examples above described and a large number of arrangements can be devised based on the same principle and consequently are included in the scope of the invention.

Having now described my invention what I claim as new and desire to secure by Letters Patent is:

1. A fly-wheel of variable inertia comprising a body symmetrically disposed about a vertical axis of rotation and provided with an annular cavity extending axially and circumferentially about said axis, a plurality of spaced plates extending radially inwardly from the periphery of said cavity, and having the inner edges thereof terminating equidistantly from said axis to thereby form weirs, and a fluid material partially filling said cavity and adapted to be moved by centrifugal force against said cavity periphery when the body is rotated, each of said plates having an opening therein disposed substantially in spaced relation to the bottom of said cavity, at least a major portion of said opening being disposed above the liquid level when the body is stationary, whereby the liquid will be permitted to flow over the weirs and through the openings at normal working speeds of the fly-wheel.

2. A fly-wheel of variable inertia comprising a body symmetrically disposed about a vertical axis of rotation and provided with an inverted frusto-conical cavity extending axially and circumferentially about said axis, a plurality of spaced plates extending radially inwardly from the periphery of said cavity, the inner edge of each of said plates terminating within said cavity equidistantly from said axis to thereby form weirs, each of said plates having an opening therein disposed substantially in spaced relation to said cavity bottom and adjacent the cavity periphery, and a fluid material partially filling said cavity and having its upper level normally disposed below said openings, said fluid adapted to be moved by centrifugal force against said periphery, whereby the radius of rotation of said liquid will increase with the speed, and whereby the liquid will be permitted to flow over the weirs and through the openings at normal working speeds of the fly-wheel.

3. A fly-wheel according to claim 1 in which said cavity periphery forms a side of each of said plate openings.

4. A fly-wheel according to claim 1 in which the cross-section area of each of said openings increases from the lower edge thereof.

5. A fly-wheel of variable inertia comprising a body symmetrically disposed about a vertical axis of rotation and provided with an inverted conical cavity extending axially and circumferentially about said axis, a liquid partially filling said cavity and adapted to be moved by centrifugal force against the cavity periphery when the body is rotated, and means for retarding the upward flow of said liquid.

6. A fly-wheel of variable inertia comprising a body symmetrically disposed about a vertical axis of rotation and provided with an inverted frusto-conical cavity, said body having a second inverted frusto-conical cavity of less conicity than said first cavity and forming a continuation of the latter, a liquid partially filling said latter cavity and adapted to be moved outwardly and upwardly by centrifugal force along said cavity walls when the body is rotated, and means for retarding the flow of liquid from one cavity to the other when said fly-wheel is in motion.

HENRI LOUIS BURNAT.